(12) United States Patent
Daller et al.

(10) Patent No.: US 10,590,792 B2
(45) Date of Patent: Mar. 17, 2020

(54) TURBINE ENGINE ROTATING AT HIGH SPEEDS

(71) Applicant: CRYOSTAR SAS, Hesingue (FR)

(72) Inventors: Rene Daller, Soultzmatt Reiningue (FR); Joseph Walch, Sausheim (FR)

(73) Assignee: CRYOSTAR SAS, Hesingue (FR)

( * ) Notice: Subject to any disclaimer, the term of this patent is extended or adjusted under 35 U.S.C. 154(b) by 432 days.

(21) Appl. No.: 15/517,523

(22) PCT Filed: Oct. 8, 2015

(86) PCT No.: PCT/FR2015/052716
§ 371 (c)(1),
(2) Date: Apr. 7, 2017

(87) PCT Pub. No.: WO2016/055745
PCT Pub. Date: Apr. 14, 2016

(65) Prior Publication Data
US 2017/0306787 A1   Oct. 26, 2017

(30) Foreign Application Priority Data
Oct. 9, 2014   (FR) ..................... 14 59699

(51) Int. Cl.
*F04D 29/26*   (2006.01)
*F01D 15/12*   (2006.01)
(Continued)

(52) U.S. Cl.
CPC ............ *F01D 15/12* (2013.01); *F01D 5/025* (2013.01); *F01D 25/005* (2013.01); *F04D 17/12* (2013.01); *F04D 29/023* (2013.01); *F04D 29/053* (2013.01); *F04D 29/266* (2013.01); *F04D 29/284* (2013.01); *F04D 29/666* (2013.01); *F04D 29/668* (2013.01); *F16D 1/116* (2013.01); *F04D 25/163* (2013.01);
(Continued)

(58) Field of Classification Search
CPC ...... F04D 29/266; F04D 17/12; F04D 29/023; F04D 29/053; F04D 29/284; F04D 29/666; F04D 29/668; F01D 5/025; F16D 1/116
See application file for complete search history.

(56) References Cited

U.S. PATENT DOCUMENTS 5,356,273 A   10/1994  Nixon
7,909,578 B2 *   3/2011  Nishiyama ............. F01D 5/025
                                           416/204 A
(Continued)

OTHER PUBLICATIONS

International Search Report for PCT/FR2015/052716, dated Jan. 18, 2016, Authorized Officer: David De Tobel, 4 pages.
(Continued)

*Primary Examiner* — David E Sosnowski
*Assistant Examiner* — Sabbir Hasan
(74) *Attorney, Agent, or Firm* — Millen White Zelano & Branigan, PC

(57) ABSTRACT

The present invention relates to a turbine engine comprising a wheel, (2) mounted on a shaft (4), and a disk (18), adjacent to the wheel (2) and mounted on the same shaft while being rotated by the latter. The disk (18) is made of a material having a density greater than that of the material used to manufacture the wheel (2). The invention is of use in a compressor/turbine.

18 Claims, 1 Drawing Sheet

(51) Int. Cl.
*F04D 17/12* (2006.01)
*F04D 29/02* (2006.01)
*F04D 29/053* (2006.01)
*F04D 29/66* (2006.01)
*F04D 29/28* (2006.01)
*F01D 5/02* (2006.01)
*F01D 25/00* (2006.01)
*F16D 1/116* (2006.01)
*F04D 25/16* (2006.01)

(52) U.S. Cl.
CPC ...... *F05D 2240/60* (2013.01); *F05D 2260/30* (2013.01); *F05D 2260/53* (2013.01); *F05D 2300/13* (2013.01); *F05D 2300/17* (2013.01); *F05D 2300/173* (2013.01); *F05D 2300/522* (2013.01)

(56) References Cited

U.S. PATENT DOCUMENTS

| | | | |
|---|---|---|---|
| 9,222,481 B2 * | 12/2015 | Alban | ............... F04D 29/054 |
| 2003/0017878 A1 | 1/2003 | Muju et al. | |
| 2007/0292268 A1 | 12/2007 | Nishiyama et al. | |
| 2011/0091324 A1 | 4/2011 | Holzschuh | |
| 2011/0262284 A1 | 10/2011 | Guenard | |
| 2012/0164005 A1 | 6/2012 | Alban | |

OTHER PUBLICATIONS

Written Opinion for International Search Report for PCT/FR2015/052716, dated Jan. 18, 2016, Authorized Officer: David De Tobel, 6 pages.

* cited by examiner

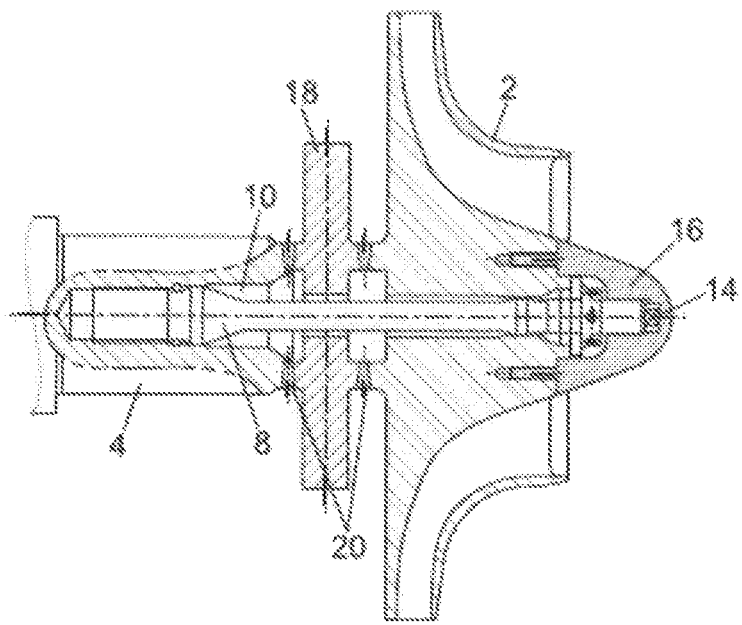

TURBINE ENGINE ROTATING AT HIGH SPEEDS

The present invention relates to a machine running at high speeds and having a centrifugal wheel. It relates more particularly to a radial turbine or compressor.

In a machine of the compressor-turbine type, also known as a compander (which is a portmanteau word formed from compressor and expander), there are one or more centrifugal compressor(s) and one or more turbine(s). These various stages are, for example, mechanically connected to a common motor (possibly a common generator) by a gearset referred to for example as a gearbox.

The same gearbox and the same design of machine may be used for different applications with different powers. It is therefore appropriate to adapt the compressor and turbine wheels to suit the new application. The rotational speeds at the centrifugal wheels may be very high. It can therefore happen that the operating speed of one or more wheel(s) of the rotary machine is a supercritical speed, namely falls within a mode of operation above the first bending mode of the shaft bearing the wheel.

When one or more wheel(s) with which a rotary machine has to be modified to suit a new application, the characteristics of the new machine may vary, notably as regards the first bending mode of the shafts of the machine. If the centrifugal wheel that replaces the original centrifugal wheel is more lightweight, then the critical speed, corresponding to the first bending mode, increases. It is therefore appropriate to avoid this critical speed falling within the operating range of the machine concerned.

Document US2011091324 relates to a rotor of a turbomachine, particularly an exhaust gas turbocharger, comprising a rotor wheel comprising a rear wheel part and comprising a rotor shaft comprising an intermediate component via which the rotor shaft is connected rigidly to the rotor wheel, the intermediate component being provided with a balancing plate in the form of a disk, the outside diameter of which is greater than the maximum diameter of the rotor shaft and which is fixed to the rear wheel part of the rotor wheel.

Document FR2969722 relates to a motor-compressor unit comprising a motor and a compressor which are mounted in a common casing sealed against the gases that are to be compressed. The motor comprises a rotor rotationally connected to a rotor of the compressor. The latter comprises a main shaft and a connecting shaft coaxial with the main shaft, the connecting shaft being arranged at least partially inside the main shaft and radially spaced from the main shaft and comprising, a coupling zone for coupling with the main shaft.

It is therefore an object of the present invention to allow the use, in a rotary machine, for a compressor or a turbine, associated with an already existing gearbox, of wheels of any type, notably of wheels that are smaller and/or more lightweight, even at high speeds, while nevertheless avoiding having a critical speed within the desired operating range.

It is another object of the present invention to make it possible to use a given wheel over a broader range of speeds without the risk of encountering a supercritical speed, and without having to modify said wheel (which therefore remains usable).

To this end, the present invention proposes a rotary machine, of the turbomachine type, comprising a wheel mounted on a shaft, characterized in that it further comprises a disk adjacent to the wheel and mounted demountably on the same shaft while being rotationally driven thereby, the disk being made from a material of a density higher than that of the material used to manufacture the wheel.

The use of an inertial disk as mentioned here makes it possible to have a rotor, formed by the rotating components including the centrifugal wheel and the additional disk, with dynamic properties adapted to suit the use that is to be made of the centrifugal wheel. It is thus possible, for example with a centrifugal wheel made of light alloy, to achieve high rotational speeds without having a region of critical speeds within the desired operating range. When the wheel of the rotor is replaced by a wheel with different characteristics, the inertial disk can likewise be replaced if necessary by another disk of which the characteristics, notably the mass, will be adapted to suit the new wheel.

In such a rotary machine, the wheel is for example made of an aluminum-based alloy. The disk itself preferably has a density higher than 15. It may for example be made of tungsten or of a tungsten-based alloy.

In a turbomachine as described hereinabove, the disk may be mounted by clamping between the wheel and the shaft.

In a preferred embodiment, provision is made for the connection between the shaft and the disk to be similar to the connection between the disk and the wheel so that the wheel can be connected to the shaft without the disk being present. Thus, it will be possible for the disk to be removed if the turbomachine is used at speeds that are sufficiently low for there to be no risk of the turbomachine operating at a supercritical speed.

The disk drive may be achieved using friction. However, in a preferred embodiment, provision may be made for the disk to be connected to the wheel by a radial toothset of the Hirth teeth type. This mounting allows the transmission of high torque and ensures very good alignment between the disk and the centrifugal wheel.

Likewise, provision is preferably made for the disk to be connected to the drive shaft by a radial toothset of the Hirth teeth type. Once again, good transmission of torque is achieved with good alignment of the elements.

In order to limit friction with the ambient surroundings, the diameter of the disk is advantageously less than the diameter of the wheel.

The structure proposed here for the turbomachine is particularly well suited to instances in which the disk and the wheel are mounted on the end of the shaft. Provision may then be made for a stud to be fixed to the shaft to extend the latter axially, and for the disk and the wheel to be clamped against the end of the shaft using a nut screwed on to a threaded end of the stud which is the opposite end to the shaft. Provision may also potentially be made for the stud to be screwed into a tapped blind axial housing opening on to a frontal face of the shaft accepting the disk. In this latter alternative form, a profiled endpiece covers the nut so as not to disturb the air (or other fluid) flow of the corresponding wheel.

The present invention also relates to a compressor turbine, or compander, characterized in that it comprises at least one rotary machine as described hereinabove. Such a compressor turbine for example comprises three centrifugal compressors and one turbine which are mechanically connected to a common motor by means of a gearset.

Details and advantages of the present invention will become better apparent from the description which follows, which is given with reference to the attached schematic drawing in which:

The single FIGURE illustrates a compressor according to the present invention.

This FIGURE reveals a centrifugal wheel 2, for example made from an aluminum-based light alloy, mounted on a shaft which is, for example, a drive shaft 4 (in instances in which the energy is supplied to the centrifugal wheel: it could also be a shaft driven by the centrifugal wheel if the latter corresponds to a turbine). The drive shaft 4 is for example connected to an engine or motor (not illustrated) by means of a gearset referred to hereinafter as a gearbox (not depicted).

The centrifugal wheel 2 is mounted on the drive shaft 4, on the end of the shaft, using a stud 8. The latter has a threaded first end screwed into a longitudinal tapped hole 10 made in the end of the drive shaft 4 and thus extends the drive shaft 4 axially. The other end of the stud 8 is likewise threaded and accepts a nut 14. As this nut 14 is screwed on to the stud 8, tension is applied to the stud 8, allowing the centrifugal wheel 2 to be mounted with preload. A profiled endpiece 16, also referred to as a nose cone, covers the nut 14 to encourage the flow of fluid at the centrifugal wheel 2. Such a setup is an example of a setup known to those skilled in the art but other known ways of mounting a wheel on a shaft could be used here.

In the example illustrated, it will be noted that there is a disk 18 present between the drive shaft 4 and the centrifugal wheel 2. This disk 18 is made from a material having a density higher than that of the material used to make the centrifugal wheel 2.

In the preferred embodiment illustrated, the disk 18 is inserted between the drive shaft 4 and the centrifugal wheel 2 and the clamping of the centrifugal wheel 2 thus clamps the disk 18. The assembly formed by the disk 18 and the wheel 2 may be assembled as explained hereinabove using a stud 8 and by clamping using a nut 14. This then yields an assembly that is entirely demountable so that the disk 18 and/or the wheel 2 can easily be changed.

Transmission of torque between the centrifugal wheel 2 and the drive shaft 4 is via the disk 18. There are various alternatives possible here. In the setup proposed here in which the disk 18 is clamped between the centrifugal wheel 2 and the drive shaft 4, a simple friction drive is possible. For preference, the coupling used between the disk 18 and the centrifugal wheel 2 and between the drive shaft 4 and the disk 18 is the same as the coupling provided originally (without the disk 18) between the centrifugal wheel 2 and the drive shaft 4. In the embodiment illustrated, the coupling each time uses radial toothsets 20, also known by the name of Hirth teeth. Thus, Hirth teeth are made, on the one hand, between the drive shaft 4 and the disk 18 and, on the other hand, between the disk 18 and the centrifugal wheel 2. This type of coupling allows excellent drive and also good alignment of the components.

The disk 18 is made from a material that is dense, having a density higher for example than 15 (which means to say a mass per unit volume higher than 15 kg/dm$^3$). It is, for example, manufactured from a tungsten-based alloy.

In order to be able to be incorporated into the turbomachine without any concerns and in order to limit friction due to the disk, provision is made for the diameter of the disk 18 to remain smaller than the outside diameter of the centrifugal wheel 2.

The presence of the disk 18 allows the natural frequencies of the rotary assembly to be tuned so as to tune the critical rotational speeds and notably avoid the nominal operating range of the machine including such critical rotational speeds.

The centrifugal wheel 2 is intended to run at high speeds, in excess of 20 000 rev·min$^{-1}$, or even in excess of 40 000 rev·min$^{-1}$. By attaching the additional disk 18 thereto, it is possible to lower the first bending mode that corresponds to the first critical speed to below the range of operation of the rotary machine by changing the physical properties of the rotary assembly or rotor. Of course, for such rotational speeds, a balancing, preferably a dynamic balancing, of each element of the assembly formed by the disk 18 and the centrifugal wheel 2 is performed.

Using a dense material from which to make the disk 18 makes it possible to limit the size of the disk 18 and therefore of the mounted assembly and also makes it possible to limit friction losses when using the rotary machine.

It is possible to use an already existing compressor or expander wheel with a given gearbox without having to do anything to the wheel (or to the gearbox). All that is required is the addition of the additional disk as described above to adapt the dynamic properties of the rotor thus obtained to suit the intended conditions of use.

In the embodiment described hereinabove, it is appropriate to choose a disk of suitable mass and a stud that is long enough to accept both the additional disk and the wheel. The latter is then mounted on the drive shaft in the same way as it is without the disk, the only exception being that it is merely appropriate not to omit to interpose this disk between the drive shaft and the wheel when mounting the latter.

It may also be pointed out that only the stud used in the embodiment described hereinabove needs to be modified in order to mount the wheel in comparison with a setup without the additional disk.

A compressor or a turbine with a centrifugal wheel and an inertial disk may for example be used in a compressor-turbine also referred to as a compander. A centrifugal wheel then corresponds to each compression and expansion stage and all the wheels are driven by a gearbox common to all the stages. In such a compander there are, for example, three compression stages and one expansion stage.

Of course, the present invention is not restricted to the preferred embodiment described hereinabove and illustrated in the drawing but also relates to all the alternative forms mentioned and throe within the competence of a person skilled in the art within the scope of the claims which follow.

The invention claimed is:

1. A turbomachine, comprising:
    a wheel (2) made from a first material having a first density and being mounted on a shaft (4) at a first point; and
    a disk (18) removably mounted to the shaft at a second point adjacent to said first point where said wheel is mounted to said shaft, said disk and said wheel being rotationally driven by said shaft, wherein said disk is made from a second material having a second density which is greater than the first density of the first material of the wheel and said second density is greater than 15 kg/dm$^3$.

2. The turbomachine of claim 1, wherein the first material of the wheel comprises an aluminum-based alloy.

3. The turbomachine of claim 1, wherein the second material of the disk comprises a material selected from the group consisting of tungsten and a tungsten-based alloy.

4. The turbomachine of claim 1, wherein the disk is clamped between the wheel and a part of the shaft.

5. The turbomachine of claim 1, wherein the shaft and the disk are connected by a first connection and the disk and the wheel are connected by a second connection, wherein the wheel can be connected to the shaft without the disk being present.

6. The turbomachine of claim 1, further comprising a radial toothset (20) connecting the disk to the wheel, wherein the radial toothset comprises Hirth-type teeth.

7. The turbomachine of claim 6, further comprising a radial toothset connecting the disk to the shaft, wherein the radial toothset comprises Hirth-type teeth.

8. The turbomachine of claim 1, further comprising a radial toothset connecting the disk to the shaft, wherein the radial toothset comprises Hirth-type teeth.

9. The turbomachine of claim 1, wherein said disk has a first diameter and said wheel has a second diameter, and said first diameter of the disk is less than said second diameter of the wheel.

10. The turbomachine of claim 1, wherein the disk and the wheel are mounted on an end of the shaft.

11. The turbomachine of claim 1, wherein said wheel is removably mounted to the shaft.

12. A turbomachine, comprising:
a shaft (4);
a stud (8) having a first end and a second threaded end, said first end being fixed to the shaft to laterally extend said shaft;
a wheel (2) made from a first material having a first density and being mounted on said stud at a first point;
a disk (18) removably mounted to the stud at a second point adjacent to said first point where said wheel is mounted to said stud, said disk and said wheel being rotationally driven by said shaft, wherein said disk is made from a second material having a second density which is greater than the first density of the first material of the wheel and said second density is greater than 15 kg/dm³, and
a nut (14) screwed to the second threaded end of the stud to damp the disc and wheel to the shaft.

13. The turbomachine of claim 12, further comprising:
a frontal face for the shaft; and
a tapped blind axial housing (10) opening on to the frontal face;
wherein the first end of said stud is threaded into the tapped blind axial housing.

14. The turbomachine of claim 13, further comprising a profiled endpiece (16) covering the nut.

15. The turbomachine of claim 13, further comprising a radial toothset (20) connecting the disk to the wheel, wherein the radial toothset comprises Hirth-type teeth.

16. The turbomachine of claim 15, further comprising a radial toothset connecting the disk to the shaft, wherein the radial toothset comprises Hirth-type teeth.

17. The turbomachine of claim 16, wherein the disk is connected to the frontal face of said shaft by said radial toothset comprising Hirth-type teeth.

18. A compressor turbine, comprising at least one turbomachine, the at least one turbomachine comprising:
a wheel made from a first material having a first density and being mounted on a shaft (4) at a first point; and
a disk removably mounted to the shaft at a second point adjacent to said first point where said wheel is mounted to said shaft, said disk and said wheel being rotationally driven by said shaft, wherein said disk is made from a second material having a second density which is greater than the first density of the first material of the wheel and said second density is greater than 15 kg/dm3.

* * * * *